(12) United States Patent
Kalaycilar et al.

(10) Patent No.: US 12,335,238 B2
(45) Date of Patent: *Jun. 17, 2025

(54) FIREWALL INSIGHTS PROCESSING AND MACHINE LEARNING

(71) Applicant: Google LLC, Mountain View, CA (US)

(72) Inventors: Firat Kalaycilar, San Jose, CA (US); Xiang Wang, Mountain View, CA (US); Gregory Lee Slaughter, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/391,772

(22) Filed: Dec. 21, 2023

(65) Prior Publication Data

US 2024/0146695 A1   May 2, 2024

Related U.S. Application Data

(63) Continuation of application No. 17/228,927, filed on Apr. 13, 2021, now Pat. No. 11,882,095.

(Continued)

(51) Int. Cl.
 *H04L 9/40* (2022.01)
 *G06F 18/214* (2023.01)
 (Continued)

(52) U.S. Cl.
 CPC ........ *H04L 63/0263* (2013.01); *G06F 18/214* (2023.01); *G06N 20/00* (2019.01);
 (Continued)

(58) Field of Classification Search
 CPC . H04L 63/0263; H04L 43/06; H04L 63/0236; H04L 63/20; H04L 63/0227;
 (Continued)

(56) References Cited

U.S. PATENT DOCUMENTS

2006/0248580 A1   11/2006   Fulp et al.
2008/0115205 A1*  5/2008   Aaron ............... H04L 63/20
                                                    726/14

(Continued)

FOREIGN PATENT DOCUMENTS

EP   3116192 A1 *   1/2017   ......... H04L 63/0209

OTHER PUBLICATIONS

International Search Report, Application No. PCT/US2021/027032, Dated Jun. 10, 2021, 13 pages.

*Primary Examiner* — John B King
(74) *Attorney, Agent, or Firm* — Honigman LLP; Brett A. Krueger

(57) ABSTRACT

A computer-implemented method causes data processing hardware to perform operations for training a firewall utilization model. The operations include receiving firewall utilization data for firewall connection requests during a utilization period. The firewall utilization data includes hit counts for each sub-rule associated with at least one firewall rule. The operations also include generating training data based on the firewall utilization data. The training data includes unused sub-rules corresponding to sub-rules having no hits during the utilization period and hit sub-rules corresponding to sub-rules having more than zero hits during the utilization period. The operations also include training a firewall utilization model on the training data. The operations further include, for each sub-rule associated with the at least one firewall rule, determining a corresponding sub-rule utilization probability indicating a likelihood the sub-rule will be used for a future connection request.

20 Claims, 8 Drawing Sheets

Related U.S. Application Data

(60) Provisional application No. 63/009,297, filed on Apr. 13, 2020.

(51) Int. Cl.
*G06N 20/00* (2019.01)
*H04L 43/06* (2022.01)

(52) U.S. Cl.
CPC .......... *H04L 43/06* (2013.01); *H04L 63/0236* (2013.01); *H04L 63/20* (2013.01)

(58) Field of Classification Search
CPC ... G06F 18/214; G06F 9/45533; G06N 20/00; G06N 5/045
See application file for complete search history.

(56) References Cited

U.S. PATENT DOCUMENTS

| | | | |
|---|---|---|---|
| 2008/0218388 A1* | 9/2008 | Noda | H03M 5/145 341/67 |
| 2011/0099482 A1* | 4/2011 | Koved | H04L 67/02 715/741 |
| 2012/0297475 A1* | 11/2012 | Aaron | H04L 63/20 726/11 |
| 2013/0019283 A1* | 1/2013 | Rice | H04L 63/20 709/225 |
| 2014/0259177 A1* | 9/2014 | P | G06F 21/6218 726/26 |
| 2015/0163242 A1* | 6/2015 | Laidlaw | H04L 63/1425 726/22 |
| 2017/0207980 A1* | 7/2017 | Hudis | H04L 41/0803 |
| 2018/0091474 A1 | 3/2018 | Tulasi | |
| 2018/0204281 A1* | 7/2018 | Painter | G06Q 30/0641 |
| 2018/0211226 A1* | 7/2018 | Wieneke | G06Q 10/107 |
| 2019/0273720 A1* | 9/2019 | Cloud | H04L 41/0894 |
| 2019/0297057 A1* | 9/2019 | Raney | H04L 41/40 |
| 2020/0183753 A1* | 6/2020 | Kumar | G06F 9/5088 |
| 2020/0204571 A1* | 6/2020 | Neznal | H04L 63/145 |
| 2020/0329011 A1* | 10/2020 | Cai | H04L 41/145 |
| 2021/0067531 A1* | 3/2021 | Meir | G06N 20/00 |
| 2021/0084013 A1* | 3/2021 | Mutnuru | H04L 41/0894 |
| 2021/0160255 A1* | 5/2021 | Cherkas | H04L 67/30 |
| 2021/0234833 A1* | 7/2021 | Schneider | G06N 3/08 |

* cited by examiner

FIREWALL INSIGHTS PROCESSING AND MACHINE LEARNING

CROSS REFERENCE TO RELATED APPLICATIONS

This U.S. patent application is a continuation of, and claims priority under 35 U.S.C. § 120 from, U.S. patent application Ser. No. 17/228,927, filed on Apr. 13, 2021, which claims priority under 35 U.S.C. § 119(e) to U.S. Provisional Application 63/009,297, filed on Apr. 13, 2020. The disclosures of these prior applications are considered part of the disclosure of this application and are hereby incorporated by reference in their entireties.

TECHNICAL FIELD

This disclosure relates to firewall insights processing using machine learning.

BACKGROUND

A virtual private cloud (VPC) is an on-demand configurable pool of shared computing resources allocated within a public cloud environment. The VPC provides isolation for a user from other cloud users. The VPC may execute one or more virtual machines (VMs) which may communication with the user's on-premises network or other remote resources via a virtual private network (VPN). Due to the potential scale and complexity of the VPC, which may include any number of VMs, network gateways, load balancers, etc., significant network configuration is often necessary to operate and maintain the VPC. For example, it is often necessary to optimize firewall configurations by updating firewall rules. The complex nature of firewall rules means makes it difficult for users to understand what rules are in use and what the effect of these rules are. One of the problems this creates is that it is difficult to maintain firewall rules over time. Rules which once made sense may not be useful as operating environments change.

SUMMARY

One aspect of the disclosure provides a computer-implemented method, that, when executed on data processing hardware causes the data processing hardware to perform operations for training a firewall utilization model. The operations include receiving firewall utilization data for connection requests received by a firewall during a utilization period, the firewall utilization data including hit counts during the utilization period for each sub-rule of a set of sub-rules associated with at least one firewall rule. The operations also include generating training data based on the firewall utilization data, the training data including unused sub-rules corresponding to sub-rules having no hits during the utilization period and hit sub-rules corresponding to sub-rules having more than zero hits during the utilization period. The operations also include training a firewall utilization model on the training data. The operations further include for each sub-rule of the set of sub-rules associated with the at least one firewall rule, determining, using the trained firewall utilization model, a corresponding sub-rule utilization probability indicating a likelihood the sub-rule will be used for a future connection request.

Aspects of the disclosure may include one or more of the following optional features. In some examples, the operations further include determining firewall attribute groupings for the at least one firewall rule, each of firewall attribute groupings including at least one firewall attribute, and determining a first set of the sub-rules associated with the at least one firewall rule based on the firewall attribute groupings.

In some implementations, the operations further include receiving a plurality of firewall logs associated with connection requests received by the firewall during the utilization period. In some configurations, the operations include filtering the plurality of the firewall logs based on a filter criteria. In some examples, the operations include determining a second set of sub-rules associated with the plurality of firewall logs, and generating the utilization data based on the first set of sub-rules and the second set of sub-rules. In some implementations, the firewall attribute groupings include at least three of a source attribute grouping, a target attribute grouping, a port range, or an internet protocol (IP). In some examples, the source attribute grouping includes source IP ranges, source tags, and source service accounts. In some configurations, the target attribute grouping includes target tags and target service accounts.

In some configurations, the operations further include receiving firewall reachability insights from a reachability module, generating firewall utilization insights based on the corresponding sub-rule utilization probability determined for each sub-rule, aggregating the firewall reachability insights and the firewall utilization insights, and generating firewall configuration recommendations based on the aggregated firewall reachability insights and firewall utilization insights. In some examples, the operations include determining unused firewall rule attributes during the utilization period, for every unused firewall rule attribute, aggregating the sub-rule utilization probabilities for all sub-rules including the unused firewall rule attribute, and determining a probability that a firewall attribute will be hit in the future based on aggregated sub-rule probabilities.

Another aspect of the disclosure provides system for training a firewall insights model. The system includes data processing hardware and memory hardware in communication with the data processing hardware. The memory hardware stores instructions that, when executed by the data processing hardware, cause the data processing hardware to perform operations. The operations include receiving firewall utilization data for connection requests received by a firewall during a utilization period, the firewall utilization data including hit counts during the utilization period for each sub-rule of a set of sub-rules associated with at least one firewall rule. The operations also include generating training data based on the firewall utilization data, the training data including unused sub-rules corresponding to sub-rules having no hits during the utilization period and hit sub-rules corresponding to sub-rules having more than zero hits during the utilization period. The operations also include training a firewall utilization model on the training data. The operations further include for each sub-rule of the set of sub-rules associated with the at least one firewall rule, determining, using the trained firewall utilization model, a corresponding sub-rule utilization probability indicating a likelihood the sub-rule will be used for a future connection request.

Aspects of the disclosure may include one or more of the following optional features. In some examples, the operations further include determining firewall attribute groupings for the at least one firewall rule, each of firewall attribute groupings including at least one firewall attribute, and determining a first set of the sub-rules associated with the at least one firewall rule based on the firewall attribute groupings.

In some implementations, the operations further include receiving a plurality of firewall logs associated with connection requests received by the firewall during the utilization period. In some configurations, the operations include filtering the plurality of the firewall logs based on a filter criteria. In some examples, the operations include determining a second set of sub-rules associated with the plurality of firewall logs, and generating the utilization data based on the first set of sub-rules and the second set of sub-rules. In some implementations, the firewall attribute groupings include at least three of a source attribute grouping, a target attribute grouping, a port range, or an internet protocol (IP). In some examples, the source attribute grouping includes source IP ranges, source tags, and source service accounts. In some configurations, the target attribute grouping includes target tags and target service accounts.

In some configurations, the operations further include receiving firewall reachability insights from a reachability module, generating firewall utilization insights based on the corresponding sub-rule utilization probability determined for each sub-rule, aggregating the firewall reachability insights and the firewall utilization insights, and generating firewall configuration recommendations based on the aggregated firewall reachability insights and firewall utilization insights. In some examples, the operations include determining unused firewall rule attributes during the utilization period, for every unused firewall rule attribute, aggregating the sub-rule utilization probabilities for all sub-rules including the unused firewall rule attribute, and determining a probability that a firewall attribute will be hit in the future based on aggregated sub-rule probabilities.

Another aspect of the disclosure provides a computer program product encoded on a non-transitory computer readable storage medium including instructions that, when executed by a data processing apparatus, cause the data processing apparatus to perform operations. The operations include receiving firewall utilization data for connection requests received by a firewall during a utilization period, the firewall utilization data including hit counts during the utilization period for each sub-rule of a set of sub-rules associated with at least one firewall rule. The operations also include generating training data based on the firewall utilization data, the training data including unused sub-rules corresponding to sub-rules having no hits during the utilization period and hit sub-rules corresponding to sub-rules having more than zero hits during the utilization period. The operations also include training a firewall utilization model on the training data. The operations further include for each sub-rule of the set of sub-rules associated with the at least one firewall rule, determining, using the trained firewall utilization model, a corresponding sub-rule utilization probability indicating a likelihood the sub-rule will be used for a future connection request.

This aspect of the disclosure may include one or more of the following optional features. In some examples, the operations further include determining firewall attribute groupings for the at least one firewall rule, each of firewall attribute groupings including at least one firewall attribute and determining a first set of sub-rules associated with the at least one firewall rule based on the firewall attribute groupings.

In some examples, the operations further include receiving a plurality of firewall logs associated with connection requests received by the firewall during the utilization period, filtering the plurality of the firewall logs based on a filter criteria, determining a second set of sub-rules associated with the plurality of firewall logs, and generating the utilization data based on the first set of sub-rules and the second set of sub-rules. In some implementations, the operations further include determining unused firewall rule attributes during the utilization period, for every unused firewall rule attribute, aggregating the sub-rule utilization probabilities for all sub-rules including the unused firewall rule attribute, and determining a probability that a firewall attribute will be hit in the future based on aggregated sub-rule probabilities.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
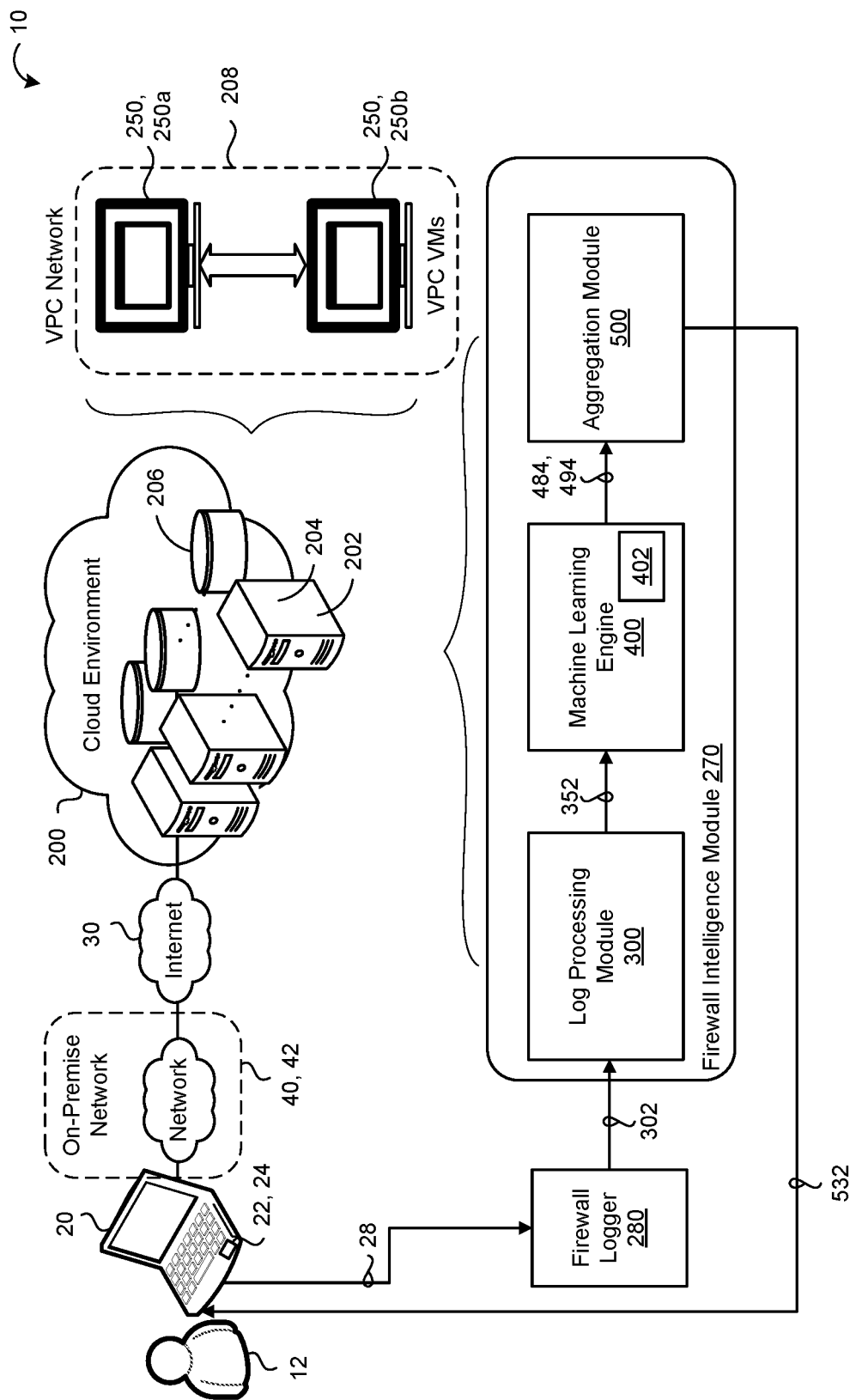
FIG. 1 is a schematic view of an example system for processing firewall insights using machine learning.

A firewall system enables system administrators to allow or deny traffic from user devices to computing resources, or vice-versa, based on a set of firewall rules. The firewall system includes a set of firewall rules that defines a list of acceptable attributes of user devices requesting to access the computing resources. That is, user devices that satisfy the list of acceptable attributes are permitted access to the computing resources, while user devices that fail to satisfy the list of acceptable attributes are blocked from accessing the computing resources. In most cases, multiple combinations of attributes (e.g., sub-rules) satisfy the list of acceptable attributes defined by the firewall rules. For example, a firewall rule that includes three attribute groupings with each attribute grouping having three acceptable attribute values creates twenty-seven possible attribute combinations (e.g. sub-rules) that satisfy the firewall rule. Here, a user device that includes attribute combinations that match any of the twenty-seven sub-rules satisfies the firewall rule and is permitted to access the computing resources.

Generally, machine learning is the process of implementing statistical techniques to provide computers with the ability to learn without being manually programmed. The computer may be provided with one or more training data sets for building an initial model and/or one or more feedback datasets for adjusting the model. Machine learning may be implemented for predicting future events or outcomes using one or more of the models built based on historical occurrences or patterns. In the context of the instant disclosure, machine learning may be used to optimize firewall configurations by predicting which firewall rules or firewall attributes are likely to be used in future connection requests.

In some implementations, firewall analysis determines which firewall rules are being utilized to access the computing resources and which firewall rules are not being used to access the computing resources. Often times, however, it is difficult to determine the particular attributes and/or sub-rules used to satisfy the firewall rules because any of the multiple attributes and/or sub-rules that exist can satisfy the firewall rule. In particular, firewall rule level analysis may only determine that a firewall rule is being used to access the computing resources, but may not determine exactly which specific attribute and/or sub-rule are used to satisfy the firewall rule. In some instances, the firewall rules include unused attributes that permit access the VMs. For example, the unused attributes may include attributes of user devices permitted to access the computing resources, however, none of the user devices actually accessing the computing resources include the particular unused attribute. Thus, firewall rules that include unused attributes allow broader access to the computing resources than required and may provide a potential future security risk.

Implementations herein are directed towards a method of executing a model to determine sub-rule and attribute level insights of the user devices accessing the computing resources. The sub-rule and attribute level insights provide the firewall system with information regarding which sub-rules and attributes are actually used to access the computing resources. The model predicts the likelihood of the attributes and sub-rules being used in the future based on historical use data. Therefore, the model may accurately determine which attributes and sub-rules of the user devices are no longer needed and can be removed from the firewall rules.

In some implementations, if an ingress allow rule has not been hit for a predetermined utilization period (e.g., 50 days), the system reports the probability that this rule will not be hit in the future based on the model. If an ingress allow rule was hit during the utilization period, the system will report if any attributes of this rule (e.g., internet protocol ranges, port ranges, etc.) unused (i.e., zero hits). For those unused attributes, the system will report the probability that they will not be hit in the future based on the model. The system also provides an explanation as to how the prediction is made, e.g., any other similar rules with similar attributes that are also unused.

Referring to FIG. 1, in some implementations, an example system 10 includes a user device 20 associated with a respective user 12 and in communication with a cloud network 200 via a network 30 (e.g., the Internet) and an on-premises network 40 (i.e., the local network that the user device 20 uses to connect to the network 30). The on-premises network 40 includes a network gateway 42 (e.g., a router) that serves as the forwarding host for the on-premises network 40. The user device 20 may correspond to any computing device, such as a desktop workstation, a laptop workstation, or a mobile device (e.g., a smart phone or tablet). The user device 20 includes computing resources 22 (e.g., data processing hardware) and/or storage resources 24 (e.g., memory hardware).

The cloud network 200 may be a single computer, multiple computers, or a distributed system (e.g., a cloud environment) having scalable/elastic resources 202 including computing resources 204 (e.g., data processing hardware) and/or storage resources 206 (e.g., memory hardware). A data store (i.e., a remote storage device) may be overlain on the storage resources 206 to allow scalable use of the storage resources 206 by one or more of the client or computing resources 204. The cloud network 200 is configured to implement and execute one or more virtual machines (VMs) 250, 250a—n. One or more of the VMs execute securely in a virtual private cloud (VPC) environment or VPC 208 associated with or operated by the user 12. The VPC 208 may include a variety of other network elements, such as load balancers, gateways, front ends, and back ends.

Figure 2:
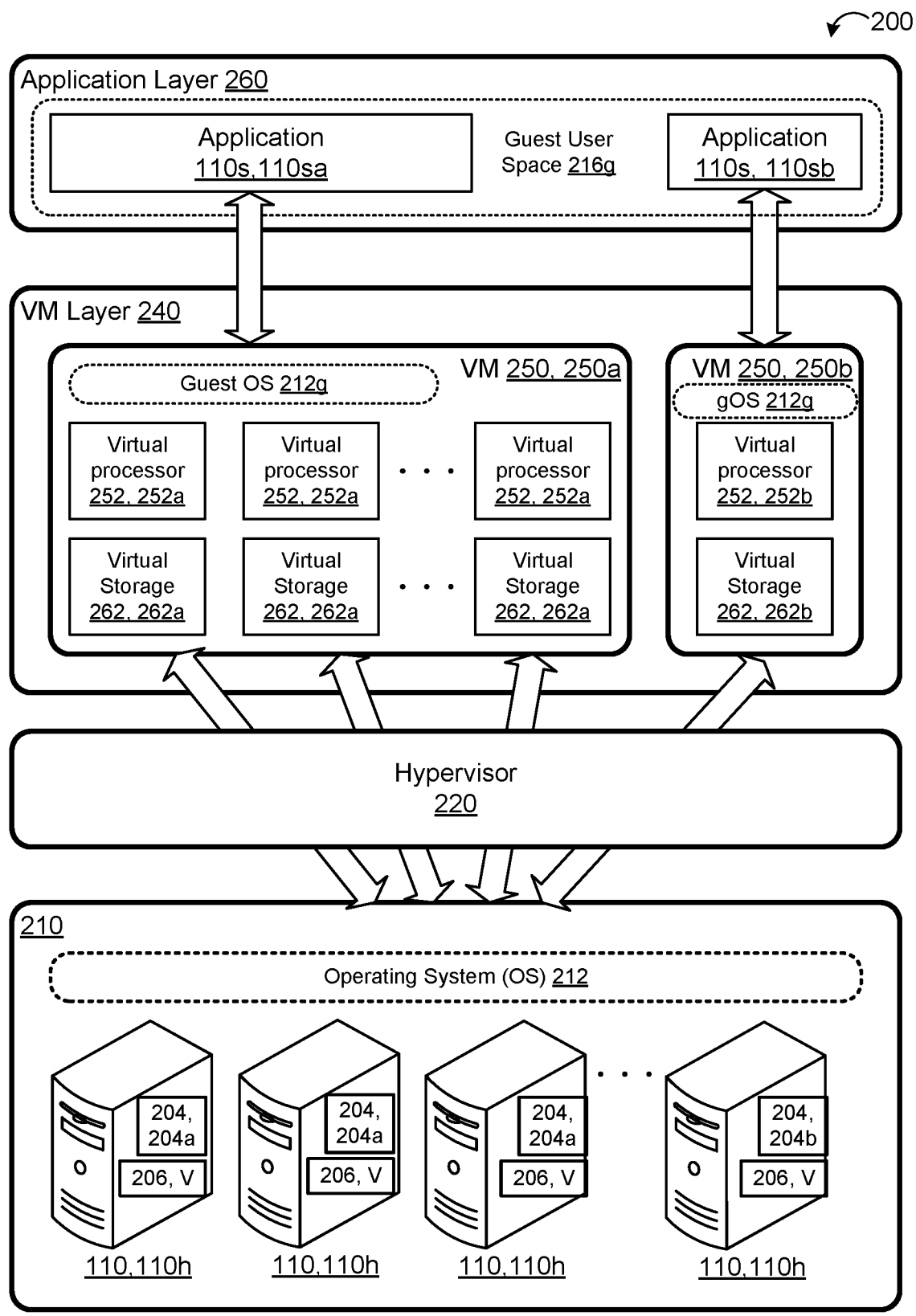
FIG. 2 is a schematic view of example components of a virtual machine of the system of FIG. 1.

In the example shown in FIG. 2, the distributed system 200 includes a collection 210 of resources 110 (e.g., hardware resources 110h), a virtual machine monitor (VMM) 220, a VM layer 240 executing one or more of the VMs 250, and an application layer 260. Each hardware resource 110h may include one or more physical central processing units (pCPU) 204 ("physical processor 204") and memory hardware 206. While each hardware resource 110h is shown having a single physical processor 204, any hardware resource 110h may include multiple physical processors 204. An operating system 212 may execute on the collection 210 of resources 110.

In some examples, the VMM 220 corresponds to a hypervisor 220 (e.g., a Compute Engine) that includes at least one of software, firmware, or hardware configured to create and execute the VMs 250. A computer (i.e., data processing hardware 204) associated with the VMM 220 that executes the one or more VMs 250 may be referred to as a host machine, while each VM 250 may be referred to as a guest machine. Here, the VMM 220 or hypervisor is configured to provide each VM 250 a corresponding guest operating system (OS) 212g having a virtual operating platform and manage execution of the corresponding guest OS 212g on the VM 250. As used herein, each VM 250 may be referred to as an "instance" or a "VM instance". In some examples, multiple instances of a variety of operating systems may share virtualized resources. For instance, a first VM 250 of the Linux® operating system, a second VM 250 of the Windows® operating system, and a third VM 250 of the OS X® operating system may all run on a single physical x86 machine.

The VM layer 240 includes one or more virtual machines 250. The distributed system 200 enables the user 12 to launch VMs 250 on demand. A VM 250 emulates a real computer system and operates based on the computer architecture and functions of the real computer system or a hypothetical computer system, which may involve specialized hardware, software, or a combination thereof. In some examples, the distributed system 200 authorizes and authenticates the user 12 before launching the one or more VMs 250. An instance of software, or simply an instance, refers to a VM 250 hosted on (executing on) the data processing hardware 204 of the distributed system 200.

Each VM 250 may include one or more virtual central processing units (vCPUs) 252 ("virtual processor"). In the example shown, a first virtual machine 250a includes a first set 252a of one or more virtual processors 252 and a second virtual machine 250b includes a second set 252b of one or more virtual processors 252. While the second set 252b is shown as only including one virtual processor 252, any number of virtual processors 252 is possible. Each virtual processor 252 emulates one or more physical processors 204. For example, the first set 252a of the one or more virtual processors 252 emulates a first set 204aa of one or more physical processors 204, and the second set 252b of the one or more virtual processors 252 emulates a second set 204b of one or more physical processors 204. The application layer 260 includes software resources 110s, 110sa, 110sb (software applications) that may execute on the virtual machine(s) 250.

Typically, each instance of software (e.g., a virtual machine 250) includes at least one virtual storage device 262 that provides volatile and non-volatile storage capacity for the service on the physical memory hardware 206. For instance, the storage capacity on the physical memory hardware 206 can include persistent disks (PD) that store data for the user 12 across several physical disks (e.g., memory regions 620 (FIG. 7) of the memory hardware 206 or random access memory (RAM) to provide volatile memory. More specifically, each virtual storage device 262 of a corresponding VM 250 moves data in sequences of bytes or bits (blocks) to an associated physical block storage volume V on the memory hardware 206 to provide non-volatile storage. Accordingly, a virtual storage device 262 of a corresponding VM instance 250 provides a storage capacity that maps to corresponding physical block storage volumes V on the memory hardware 206. In some examples, the virtual storage devices 262 support random access to the data on the memory hardware 206 and generally use buffered I/O. Examples include hard disks, CD-ROM drives, and flash drives. Similarly, portions of volatile memory (e.g., RAM) of physical memory hardware 206 may be divided across the virtual storage devices 262.

Within the guest operating system 212g resides a guest kernel 214g. A kernel is a computer program that is the core of the operating system with full access and control over the OS. That is, the kernel is an intermediary between applications 110s and the hardware resources 110h of the host machine. Most modern computing systems segregate virtual memory into protected kernel space and user space 216g. The kernel typically remains in volatile memory within the protected kernel space and is isolated from user space 216g. To increase safety and reliability, applications 110s and other software services typically execute in the guest user space 216g and lack the privileges necessary to interact with the protected kernel space.

Referring back to FIG. 1, the cloud network 200 may also execute a firewall intelligence module 270 including a log processing module 300 (FIG. 3), machine learning engine 400 (FIGS. 4A and 4B), and an aggregation module (500). The firewall intelligence module 270 obtains a plurality of firewall logs 302 generated by a firewall logger 280 of the system. Each of the firewall logs 302 corresponds to a connection request 28 received from the user device 20. Each firewall log 302 includes firewall rules 312 associated with the connection request 28.

Figure 3:
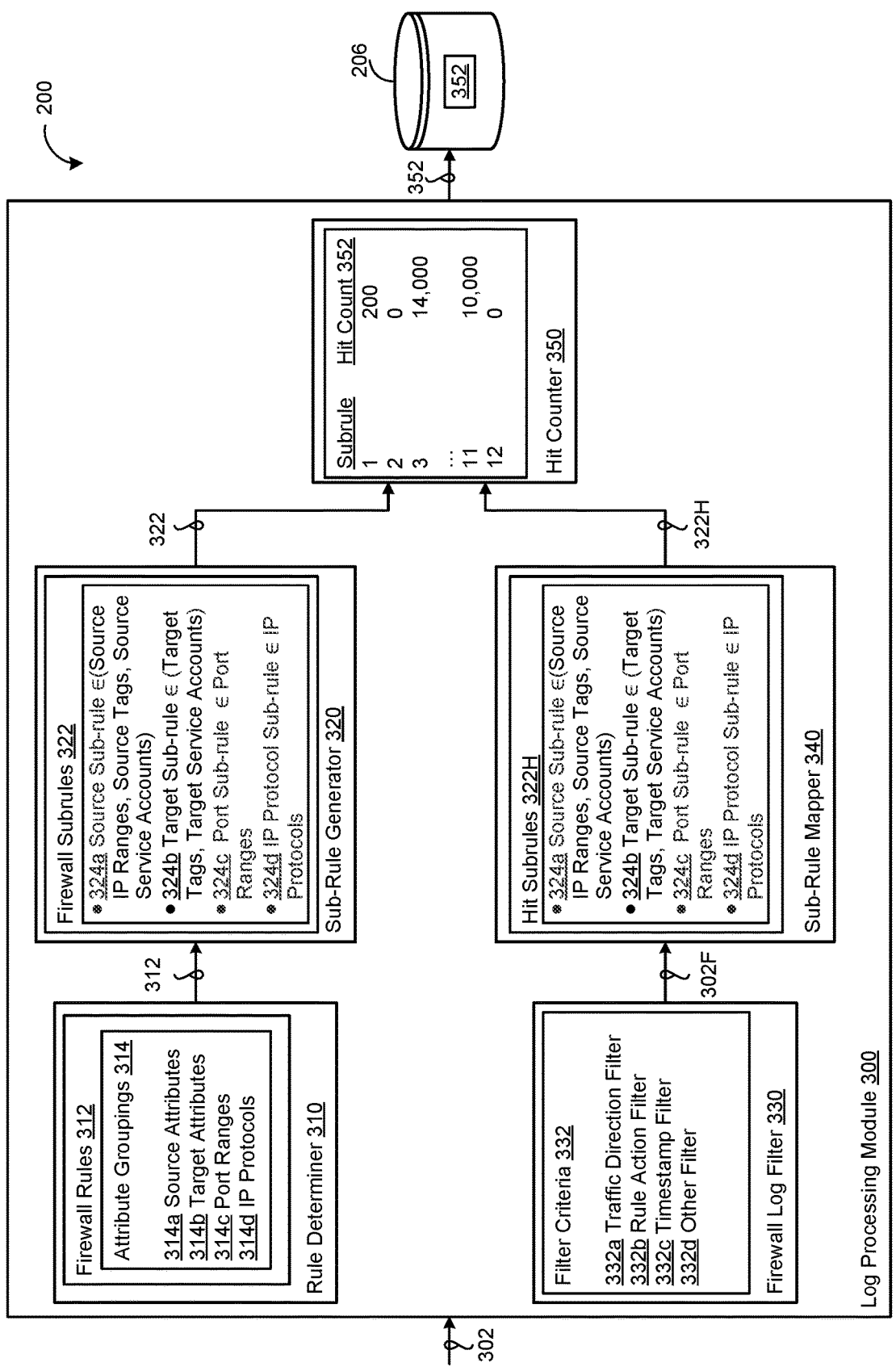
FIG. 3 is a schematic view of a log processing module of the system of FIG. 1.

Referring to FIG. 3, the log processing module 300 includes a firewall rule determiner 310, a sub-rule generator 320, a firewall log filter 330, a sub-rule mapper 240, and a hit counter 250. The log processing module 300 is configured to receive or obtain a first set of the firewall logs 302 corresponding to a utilization period (e.g., previous 50 days). Using the logs 302, the log processing module 300 determines firewall rules 312, sub-rules 322, and attributes 324 for the firewall, and then generates utilization data 352 including hit counts for the firewall rules 312, sub-rules 322, and/or attributes 324. The rule determiner 310 obtains a plurality of firewall logs 302 from the firewall logger 280 of the distributed system 200 for the predetermined utilization period (e.g., previous 50 days). The rule determiner 310 is configured to determine firewall rules 312 based on the firewall logs 302. The firewall logs 302 include information about the connection requests 28 from the one or more user devices 20 requesting access to the distributed system 200. In particular, the firewall logs 302 may include traffic direction (e.g., ingress or egress) of the connection requests 28, firewall rule action (e.g., permit or block) of the connection requests 28, timestamps of the connection requests 28, or any other information about the requests. Each firewall log 302 of the plurality of firewall logs 302 may be generated in response to a trigger event such as receiving, accepting, and/or denying the connection request 28 from a user device 20. The firewall logs 302 may also be generated at a set time interval (e.g., hourly, daily, weekly, etc.). The firewall logs 302 may be stored in the storage resources 206 of the distributed system 200 and/or the memory hardware 24 of the user device 20.

The rule determiner 310 determines, based on the plurality of firewall logs 302, the firewall rules 312 that control access to the distributed system 200. The firewall rules 312 define attributes 324 required by the connection request 28 from the user device 20 to the distributed system 200 in order for the user device 20 to access the distributed system 200. The attributes 324 of the connection request 28 from the user devices 20 may be grouped into attribute groupings 314, 314a—d, including a source attribute grouping 314a, a target attribute grouping 314b, a port range attribute grouping 314c, and an IP protocol attribute grouping 314d.

The source attribute grouping 314a defines one or more attributes 324 of the source of the connection request 28 to access the distributed system 200. For example, a user device 20 is the source when the user device 20 sends a connection request 28 to the distributed system 200 to access one of the computing resources 202. Here, each attribute 324 of the user device 20 represents one of the attributes 324 of the source attribute grouping 314a. The attributes 324 of the source attribute grouping 314a may include source internet protocol (IP) ranges, source tags, and source service accounts. The firewall rule 312 may define one or more attribute values for each attribute 324 in the source attribute grouping 314a. For example, an attribute value of the source IP range attribute grouping 314a includes the specific value of the source IP range of the user device 20.

The target attribute grouping 314b defines one or more attributes of the requested target. For example, where a user device 20 requests access to a particular computing resource 202, the particular computing resource 202 is the target. The target attribute grouping 314b may include attributes 324 of target tags and target service accounts. The firewall rule 312 may define one or more attribute values for each attribute 324 in the target attribute grouping 314b. For example, an attribute value of the target tag attribute may include "receiver" and/or "receiver_tmp." Optionally, the firewall rule 312 may define one or more attribute values of the port range attribute grouping 314c and/or the IP protocol attribute grouping 314d associated with the connection request.

User devices 20 that include one or more of the attribute values defined by the attribute groupings 314 of the firewall rule 312 are allowed to access the computing resources 202. Conversely, user devices 20 that do not include attribute values defined by the attribute groupings 314 of the firewall rule 312 are denied from accessing the computing resources 202. In some examples, the firewall rule 312 requires the user devices 20 to include a particular combination of the one or more attribute values (e.g., sub-rules 322) to access the computing resources 202. That is, the firewall rule 312 may require the user device 20 to include attribute values that satisfy one or more of the source attribute grouping 314a, the target attribute grouping 314b, the port range attribute grouping 314c, and/or the IP protocol attribute grouping 314d. In some examples, the rule determiner 310 determines multiple firewall rules 312 for each firewall log 302 in the plurality of firewall logs 302. The rule determiner 310 sends each of the firewall rules 312 to the sub-rule generator 320.

The sub-rule generator 320 is configured to generate all possible sub-rules 322 for each of the firewall rules 312 using the attribute groupings 314. Each sub-rule 222 represents one of the acceptable combinations of attribute values 324, 324a—d defined by the firewall rule 312. For instance an example firewall rule 312 may define attribute values 324 that includes (i) a source IP range attribute 324a with an allowed attribute values of "103.18.18.0/22" or "10.0.0.1", (ii) a source tag attribute 324a with acceptable attribute values of "sender," (iii) a target tag attribute 324b with acceptable attribute values of "receiver" and "receiver_tmp," and (iv) a port range attribute 324c with acceptable attribute values of "tep:100-120 and udp:200". Here, the firewall rule 312 defines three attributes 324a in the source attribute grouping 314a (e.g., 103.18.18.0/22, 10.0.0.1, sender), two attributes 324b in the target attribute grouping 314b (e.g., receiver, receiver_tmp), and two attributes 324c in the port range attribute grouping 314c (e.g., tep:100-120, udp:200) for a total of twelve combinations of attribute values (i.e., 3×2×2). Each one of the twelve combinations of acceptable attribute values defines a sub-rule 222. For example, (103.18.18.0/22, receiver, and tep:100-120) is one of the sub-rules 322 and (sender, receiver, and tep:100-120) is another one of the sub-rules 322 from the twelve possible sub-rules 322. The sub-rule generator 320 sends all possible sub-rules 322 associated with each of the firewall rules 312 to the hit counter 250.

In some examples, the sub-rule generator 320 is configured to execute a sub-rule generation function $f_{322}$ to generate all combinations of sub-rules 322 possible for a particularly firewall rule 312. One example implementation of a sub-rule generation function $f_{322}$ includes a deep nested for-loop enumerating all combinations of sub-rules 322 possible for each repeated attribute 324 in the firewall rule 312. The sub-rule generation function $f_{322}$ iterates through each repeated attribute 324 in the firewall rule 312 and enumerates all sub-rules 322 by flattening each repeated attribute 324. A dummy array can be used, containing a single dummy element in case the actual repeated attribute 324 is empty to be able to iterate through the attribute 324 and generate all the combinations for remaining attributes 324 inside the loop.

The firewall log filter 330 (referred to herein also as log filter 330) is configured to filter the plurality of firewall logs 302 for the utilization period into filtered firewall logs 302F. The log filter 330 filters the plurality of firewall logs 302 into the subset of filtered firewall logs 302F based on filter criteria 332, 332a-d. The filter criteria 332 may include traffic direction 332a (e.g., ingress or egress) of the requests, firewall rule action 332b (e.g., permit or block) of the requests, timestamps 332c of the requests, or any other information 332d about the requests. For example, filter criteria 332 that includes ingress traffic direction 332a will filter out all of the firewall logs 302 that do not include ingress traffic. The log filter 330 allows the user 12 or system administrator to filter the plurality of firewall logs 302 to only consider firewall logs 302 that satisfy a desired filter criteria 332. The log filter 330 sends the subset of filtered firewall logs 302F to the sub-rule mapper 240.

The sub-rule mapper 240 is configured to determine the sub-rules 322, 322H for the filtered firewall logs 302F (e.g., firewall logs of interest) using the same sub-rule generation function $f_{322}$ as the sub-rule generator 320. Thus, the sub-rule mapper 240 evaluates each of the filtered firewall logs 302F to determine which firewall sub-rules 322H were used or hit by the corresponding connection request 28. The hit sub-rules 322H are the particular sub-rules 322 used by the user device 20 to access the computing resources 202. That is, each time a user device 20 accesses one of the computing resources 202 with a particular sub-rule 222, the sub-rule mapper 240 marks the particular sub-rule 222 as hit. For example, a firewall rule 312 defines allowable source tag attributes 324a of "sender" and "sender_tmp" and allowable port range attributes 324c of "tep:100-120" and "udp:200." In this example, a user device 20 that includes the (sender, tep:100-120) sub-rule 322 is permitted access to the computing resources 202. The sub-rule mapper 340 maps the sub-rule 322 of (sender, tep:100-120) as a hit sub-rule 322H because that particular sub-rule 322 was used to access the computing resources 202. The sub-rule mapper 340 sends each of the hit sub-rules 322H for the filtered firewall logs 302F to the hit counter 250.

The hit counter 350 is configured to generate utilization data 352 including a hit count for each sub-rule 322. In the illustrated example, the hit counter 350 generates a utilization data 352 for each of the twelve sub-rules 322 identified by the sub-rule generator 320. In particular, the hit counter 350 receives all possible sub-rules 322 from the sub-rule generator 320 and the hit sub-rules 322H for the filtered firewall logs 302F from the sub-rule mapper 240. Thus, the hit counter 350 is able to determine from all the possible sub-rules 322 and the hit sub-rules 322H which of the sub-rules 322 are utilized to access the computing resources 202. The hit counter 350 may also generate a count associated with each of the hit sub-rules 322H. The count represents the number of times a particular sub-rule 322, 322H has been used to access the computing resources 202. The hit counter 350 aggregates all of the sub-rules 322, hit sub-rules 322H, and counts into the utilization data 352. The hit counter 350 may execute at desired periodic intervals to generate new utilization data 352. For example, the hit counter 350 may generate the utilization data 352 at a temporal interval (e.g., daily) or a volumetric interval (e.g., every 1000 filtered firewall logs 302F). The hit counter 350 may store the utilization data 352 in the storage resources 206 for training the model 402 and/or execution of the model 402.

The firewall intelligence module 270 further includes the machine learning engine 400 configured to train and execute a firewall utilization model 402 to inform and assist network administrators in determining which firewall rules 312 or attributes 324 are being utilized. Generally, rule-level utilization analysis executed by the firewall intelligence module 300 shows which firewall rules 312 are being actively used. However, since the sub-rules 322 are in OR-relationships with each other, rule-level analysis cannot guarantee that every sub-rule 322 is used. Accordingly, there could be rules 312 that are broader than necessary, which may allow unwanted requests in the future. In order to detect this problem, the firewall intelligence module 270 makes make utilization analysis at a finer level: sub-rules. At the sub-rule level, the firewall intelligence module 270 can determine which sub-rules 322 are actually hit and consequently which attributes 324 are needed.

Although sub-rule level utilization data 352 is more useful than rule level data, it is not sufficient to take action on firewall rules 312. For instance, a sub-rule 322 might have 0 hits on the current day, but may be needed in the future.

Therefore even with sub-rule level utilization data 352, it is not easy for network administrators to decide if an existing firewall rule 312 needs modification.

To inform and assist the network administrators, the firewall intelligence module 270 implements the machine learning engine 400 to derive rule-level and attribute-level insights from utilization data 352. The machine learning engine 400 can determine the probability that a particular attribute 324 will be hit in the future based on historical sub-rule utilization patterns. This way, unneeded attributes 324 may be safely deduced and reported to network administrators so that they can make informed decisions to modify the firewall rules 312.

Figure 4A:
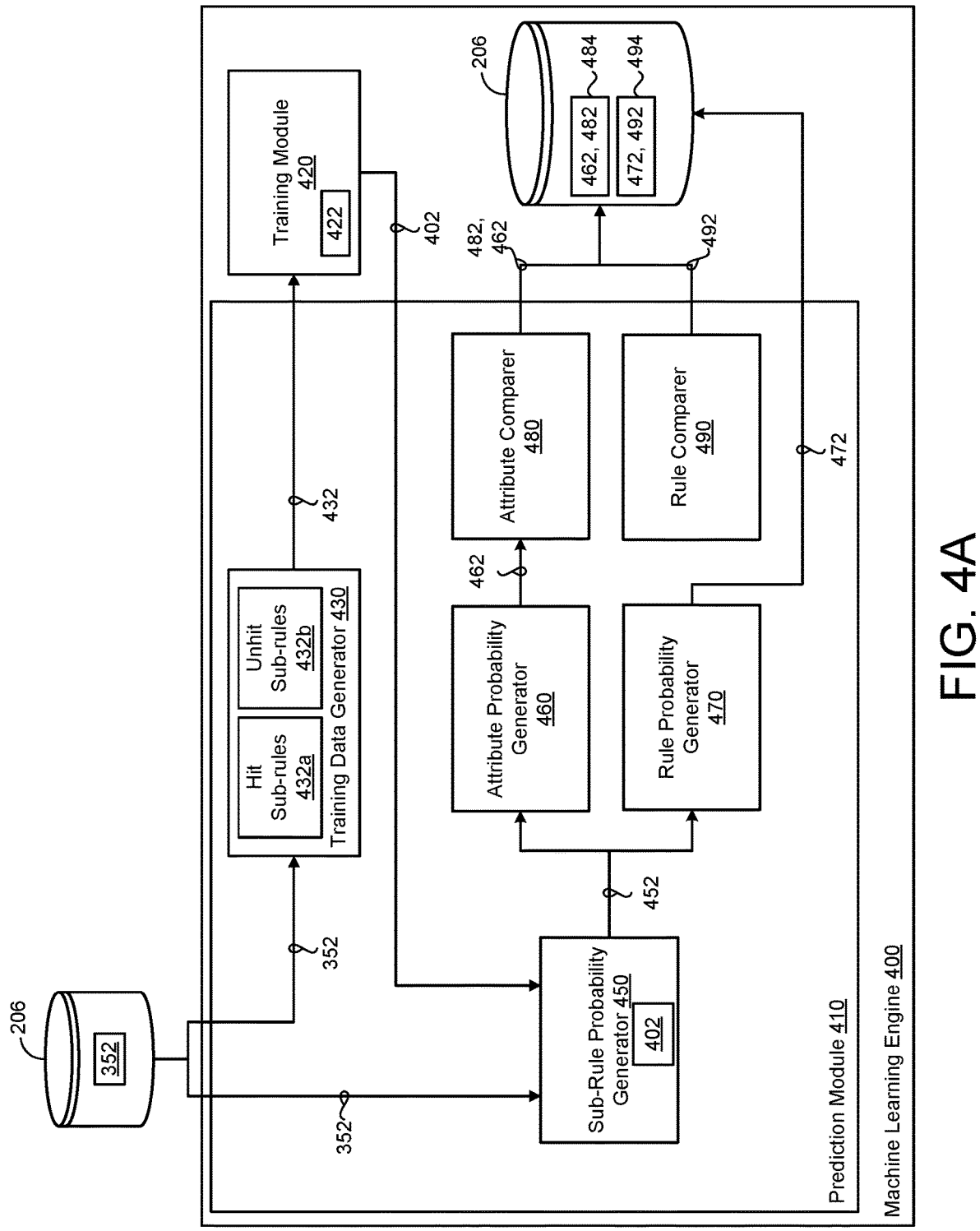
FIGS. 4A and 4B are schematic view of a machine learning engine of the system of FIG. 1.
Figure 4B:
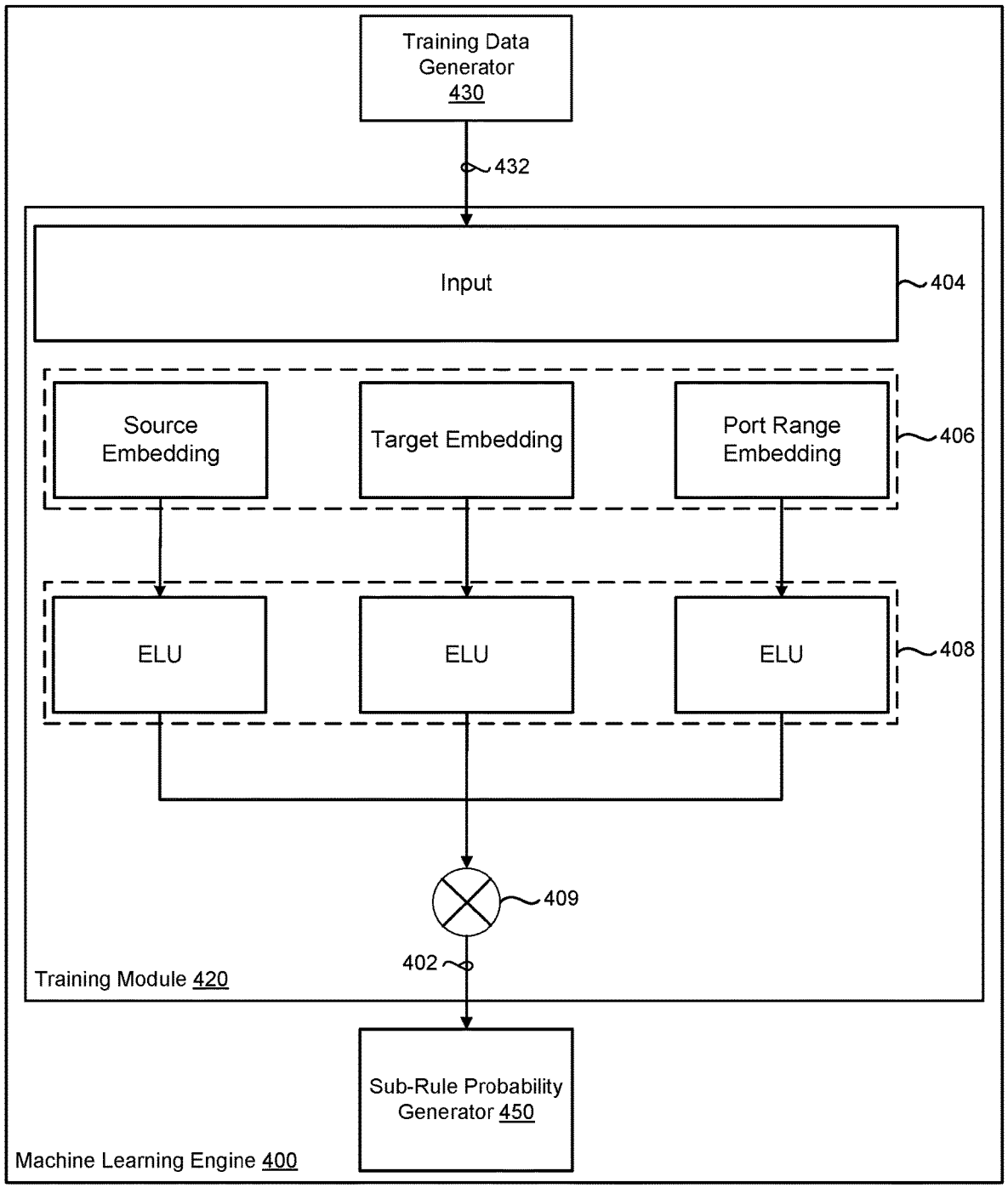

The machine learning engine 400 may be implemented as a machine learning engine and includes a prediction module 410 (FIG. 4A) and a training module 420 (FIG. 4B. Generally, the prediction module 410 is configured to predict future hit probabilities for unused rules 312, sub-rules 322, and/or attributes 324. Based on the prediction, the prediction module 410 outputs training data 432 and utilization insights 484, 494 for subsequent iterations of the firewall utilization model 402. The training module 420 receives the training data 414 from the prediction module 410 and trains the firewall utilization model 402 for use by the prediction module 410 in subsequent iterations of determining hit probabilities for unused rules 312, sub-rules 322, and attributes 324.

The prediction module 410 includes a training data generator 430 that receives the utilization data 352 and generates training data 432 using the utilization data 352. The training data generator 430 converts every sub-rule 322 to a feature vector and associates each sub-rule with the labels such as "hit" (hit count >0) and "unhit" (hit count=0). The labeled training data 432 is used by training module 420 to train a new or existing firewall utilization model 402.

Referring to FIG. 4B, the training module 420 receives the labeled training data 432 from the training data generator 430 and uses the training data 432 to build and train one or more firewall utilization models 402. Generally, the training module 420 executes a training process to train the firewall utilization model 402 on the training data 432. The training process may include implementation of one or more machine learning algorithms and/or statistical analysis for identifying trends or patterns in the training data 432, which can then be used to predict future hits of the firewall sub-rules 322. The training module 420 may also utilize machine learning and statistical analysis to tune and/or adjust parameters of the firewall utilization model 402. Here, the training module 420 may continuously improve determinations of predicted hits of firewall sub-rules 322. Machine learning may include, for example, supervised learning, unsupervised learning, semi-supervised learning, transduction, reinforcement learning, and other learning algorithms. For example, machine learning algorithms may include AODE, artificial neural networking, Bayesian algorithms, case-based reasoning, decision tree algorithms, Gaussian process regression, regression analysis, fuzzy algorithms, and/or a customized machine learning algorithm including aspects of any machine learning algorithm.

As discussed above, an example firewall sub-rule 322 may have seven attributes 324: source range 324a, source tag 324a, source service account 324a, target tag 324b, target service account 324b, port range 324c, and IP protocol 324d. However, for training and inference purposes, the sub-rule 322 can be represented as a 3-tuple (source attributes, target attributes, port range attributes) since, at most, one of the three source-related attributes 324a is non-empty and, at most, one of the two target-related attributes 324b is non-empty, by definition.

Some source and target attributes 324 are only meaningful for the particular network 200 they belong to. These are source tags 324a, source ranges 324a, and target tags 324b. Therefore, when using these values of these attribute values 324a, 324b for inference or training, the training module 420 prepends the 'network' identifier to distinguish these attributes 324 from the same attributes 324 defined in external networks. For example, if the source range is '10.0.0.1', it is converted to 'network_identifier:10.0.0.1'. But if it is an external source range, like '210.10.10.10', it is kept as is. If 'source' is empty, it is assumed to be '0.0.0.0/0' since an empty source means no limitation on incoming connections. If 'target' is empty, it is assumed to be 'network_identifier: every_VM_in_network' (any unique string after the network prefix will do).

At the time of training, the training module 420 combines all possible values of the attributes 324 observed in the training data 432 for 'Source' and 'Target' to create a source-target vocabulary. Similarly, the training module 420 creates a port range vocabulary 422. Later, these vocabularies are used to convert string attribute values to one-hot encoded feature vectors. By concatenating these three sparse vectors, the training module 420 obtains the feature representation for each sub-rule 322.

In the example of FIG. 4B, the firewall utilization model 402 is illustrated as a neural network. An input layer 404 accepts the training data 432 explained above. The next layer 406 is an embedding layer 406, which maps the feature vector to a lower dimensional feature. An ELU (exponential linear unit) layer 408 is configured to capture feature non-linearity. A compute layer 409 determines the inner product of the output of the ELU layer 408 to create associations between different attributes 324. An output layer of the firewall utilization model 402 is a sigmoid that maps the result to a value between 0 and 1, which can be interpreted as a future hit probability.

Once the firewall utilization model 402 is trained, the training module 420 executes a two-step framework to evaluate and validate the performance of the firewall utilization model 402. In an initial step, the firewall utilization model 402 is evaluated to ensure that the firewall utilization model 402 is ready for use in the production network 200 by determining whether the firewall utilization model 402 satisfies performance criteria. Once the firewall utilization model 402 is implemented in the production network 200 (e.g., blocks 450-490 of FIG. 4A), the firewall utilization model 402 is evaluated on a periodic basis (e.g., daily) to determine whether the predicted sub-rule utilization accurately reflects the actual sub-rule utilization. In some implementations, multiple firewall utilization models 402 are trained and staged for execution by the machine learning engine 400. Thus, when performance of a current firewall utilization model 402 drops below a threshold performance value, the current firewall utilization model 402 can be replaced by one of the staged firewall utilization models 402.

With continued reference to FIG. 4A, the prediction module 410 executes the current iteration of the trained firewall utilization model 402. The firewall utilization model 402 is configured to predict future hit probabilities for firewall rules 312, sub-rules 322, and attributes 324 based on the rule utilization data (e.g., utilization data 352). The future hit probabilities represent the likelihood that the particular firewall rule 312, sub-rule 222, and attribute 324 will be used or hit by a connection request 28 in the future.

The prediction module 410 may include a sub-rule probability generator 450, an attribute probability generator 460, and a rule probability generator 470. The sub-rule probability generator 450 is configured to generate a sub-rule utilization probability 452 for each of the sub-rules 322 based on the utilization data 352 and the firewall utilization model 402. That is, based on all of the possible sub-rules 322, the hit sub-rules 322H, and the counts associated with the hit sub-rules 322H, the sub-rule probability generator 450 determines the likelihood of a particular sub-rule 222 being hit in the future. In some examples, the sub-rule probability generator 450 generates the sub-rule utilization probabilities 452 only for unused sub-rules 322. In other examples, the sub-rule probability generator 450 generates the sub-rule utilization probabilities 452 for all of the possible sub-rules 322. The sub-rule probability generator 450 sends the sub-rule utilization probability 452 for each of the sub-rules 322 to the attribute probability generator 460 and the firewall rule probability generator 470.

The attribute probability generator 460 is configured to generate an attribute probability 462 that represents the likelihood of a particular attribute 324 for the firewall rule 312 being used in the future. The attribute probability generator 460 generates the attribute probability 462 based on the aggregation of sub-rule utilization probabilities 452. That is, for every attribute 324 that is unused during the utilization period, the attribute probability generator 460 aggregates the sub-rule utilization probabilities 452 of all the sub-rules 322 that include the particular attribute 324. The attribute utilization probability 462 may be represented by:

$$P(\text{attribute}_{value}) = 1 - [P(\text{sub}_{rule_1}) * \ldots * P(\text{sub}_{rule_n})] \quad (1)$$

In equation 1, $P(\text{attribute}_{value})$ represents the probability 462 that the particular attribute 324 will be used, $P(\text{sub}_{rule_1})$ represents the probability that the first sub-rule 222 that includes the particular attribute 324 will not be used, and $P(\text{sub}_{rule_n})$ represents the probability that the $n^{th}$ sub-rule 222 that includes the particular attribute 324 will not be hit. Thus, by aggregating each of the sub-rule utilization probabilities 452 for sub-rules 322 that include a particular attribute 324, the attribute probability generator 460 determines the probability 462 that a particular attribute 324 will be used in the future. The attribute probability generator 460 sends each of the attribute utilization probabilities 462 to the attribute comparer 480.

The attribute comparer 480 is configured to identify attributes 324 that are similar to each unused attribute (i.e., attributes with zero hits). Particularly, for each of the attributes 324, the attribute comparer 480 determines a similarity score 482 that represents the similarity between a particular attribute 324 and one of the unused attributes 324. The attribute comparer 480 determines the attribute similarity score 482 by comparing the attribute utilization probabilities 462 of each of the attributes 324. In particular, the attribute comparer 480 determines that attributes 324 that include similar attribute probabilities 462 include similar attribute information.

In some examples, the prediction module 410 may determine, based on the attribute probabilities 462 and similarity scores 482, attributes 324 that can be eliminated from the firewall rules 312. For example, attributes 324 that include attribute probabilities 462 that fail to satisfy a threshold value may be eliminated from the firewall rules 312 because of the low likelihood of being hit in the future. In another example, attributes 324 that include similarity scores 482 that satisfy a threshold value may be eliminated because the attribute 324 is a duplicate of another attribute 324. That is, the attribute 324 may be similar enough to another one of the attributes 324 that the attribute 324 does not need to be included in the firewall rules 312. The similarity scores 482 and attribute probabilities 462 may be stored as unused attribute insights 484, which can be used by the network administrator to modify attributes 324.

The rule probability generator 470 is configured to generate a rule probability 472 that represents the likelihood of each of the firewall rules 312 being hit in the future. That is, for every firewall rule 312 that is unused during the utilization period, the rule probability generator 470 aggregates the sub-rule utilization probabilities 452 of all possible sub-rules 322 for the firewall rule 312. The firewall rule probability 472 may be represented by:

$$P(\text{rule}) = 1 - [P(\text{sub}_{rule_1}) * \ldots * P(\text{sub}_{rule_n})] \quad (2)$$

In equation 2, P(rule) represents the probability that the firewall rule will be used, $P(\text{sub}_{rule_1})$ represents the probability that the first sub-rule 222 of the firewall rule 312 will not be used, and $P(\text{sub}_{rule_n})$ represents the probability that the $n^{th}$ sub-rule 222 of the firewall rule 312 will not be used. The firewall rule probability generator 470 sends each of the rule probabilities 472 to the firewall rule comparer 490.

The firewall rule comparer 490 is configured to find rules 312 that are similar to each unused rule 312. Particularly, for each of the firewall rules 312, the firewall rule comparer 490 determines a rule similarity score 492 by comparing attributes 324 between firewall rules 312. The firewall rule comparer 490 determines that firewall rules are similar when the firewall rules have a threshold number of attributes 324 in common, resulting in a high rule similarity score 492 for the respective firewall rules 312. The rule probability generator 470 and the rule comparer 490 compile and store the respective rule probabilities 472 and the rule similarity scores 492 as unused rule insights 494. Collectively, the unused rule insights 494 and the unused attribute insights 484 may be referred to as utilization insights 484, 494.

Referring back to FIG. 1, the firewall intelligence module 270 may also include an aggregation module 500 (FIG. 5) configured to aggregate recommended firewall configurations provided by each of the prediction module 410 (i.e., using the trained firewall utilization model 402) and a reachability module 540 operating independent of the machine learning engine 400. For example, the reachability module 540 provides reachability insights 542 related to shadowed firewall rules 312 (i.e., rules overlapping with other rules) and unused firewall rules 312 that have not been hit for a period of time (e.g., 50 days), while the machine learning engine 400 provides utilization insights 484, 494 predicting the probability that unused rules 312 or attributes 324 will be used in the future.

The different types of insights 542, 484, 494 may result in conflicts. For example, the utilization insights 484, 494 generated by the prediction module 410 include sub-rules 322 for all firewall rules 312, which may need to be modified to filter out unused and shadowed rules identified by the reachability insights 542. Additionally, some of the rules 312 may have overlapping behavior where they are shadowed and unused. These overlapping rules 312 may need to be combined.

Figure 5:
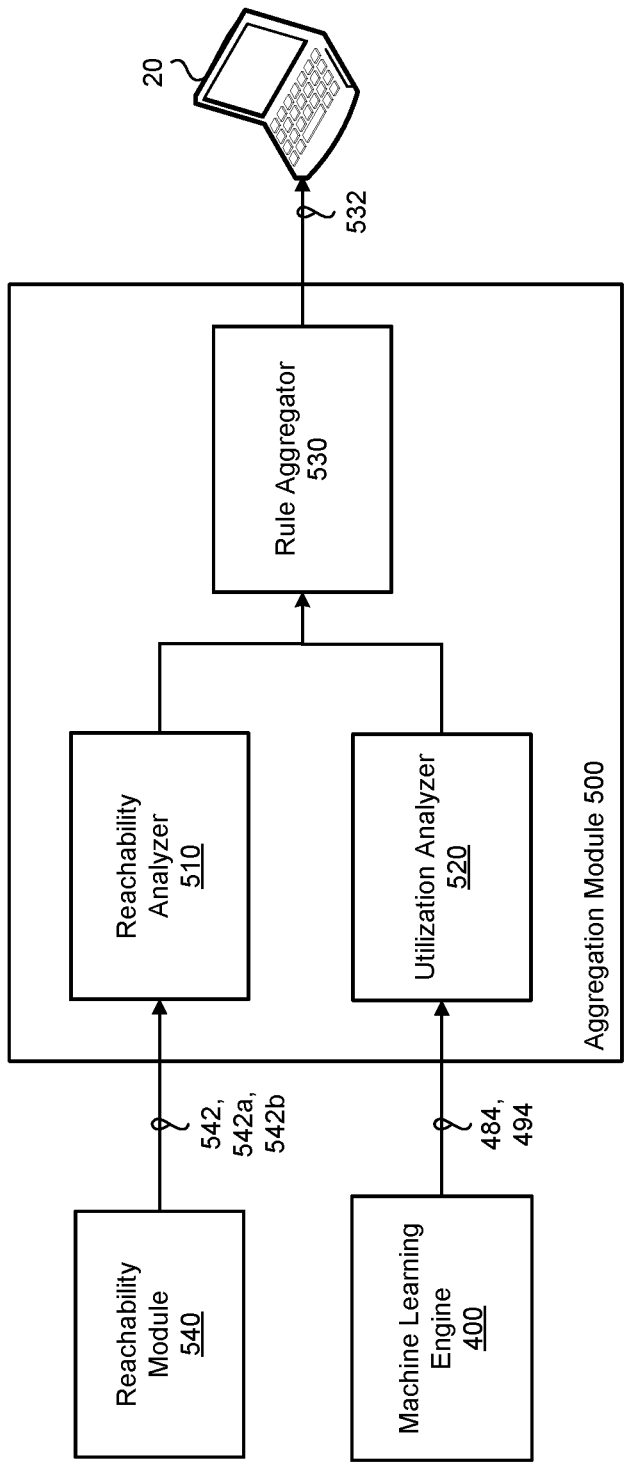
FIG. 5 is a schematic view of a rule aggregator of the system of FIG. 1.

As shown in FIG. 5, a reachability analyzer 510 of the aggregation module 500 polls a reachability module 540 to obtain reachability insights 542, which include unused rule insights 542a and shadowed rule insights 542b. A utilization analyzer 520 obtains the utilization insights 484, 494 generated by the machine learning engine 400. A rule aggregator 530 then groups all of the insights 542, 484, 494 based on the firewall rules 312. In one configuration, the rule aggregator 530 groups the insights 542, 484, 494 by ranking the different insights 542, 484, 494 using a particular ranking criteria, such as shadowed rules>unused rules>sub-rule utilization. The aggregation module 500 then presents the top-ranked insight 542, 484, 494 for each firewall rule 312 to the system administrator as firewall configuration recommendations 532. Accordingly, where a firewall rule 312 includes a shadow insight 542 and a utilization insight 484, the rule aggregator 530 may only generate the firewall configuration recommendations 532 based on the shadow insight 542. While the aggregation module 500 is shown in FIG. 1 as being incorporated as part of the firewall intelligence module 270, the aggregation module 500 may be executed independently of the firewall intelligence module 270.

Figure 6:
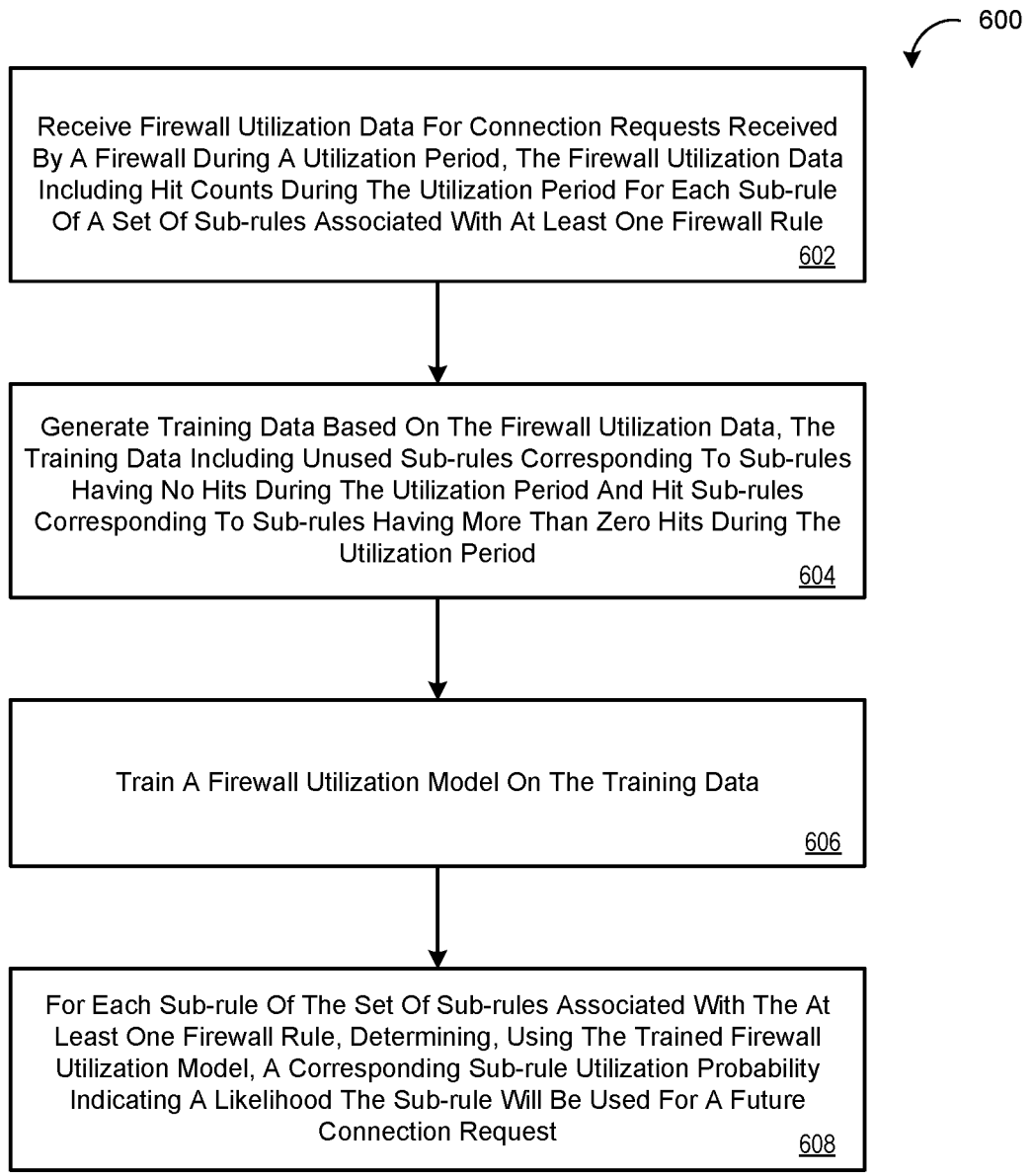
FIG. 6 is a flowchart of an example arrangement of operations for a method of performing change impact simulation analysis.

FIG. 6 is a flowchart of an exemplary arrangement of operations for a method 600 of processing firewall insights using machine learning. The method 600 includes, at operation 602, receiving firewall utilization data 352 for connection requests 28 received by a firewall during a utilization period, the firewall utilization data 352 including hit counts during the utilization period for each sub-rule 322 of a set of sub-rules 322 associated with at least one firewall rule. At operation 604, the method 600 includes generating training data 432 based on the firewall utilization data 352, the training data 432 including unused sub-rules 322 corresponding to sub-rules 322 having no hits during the utilization period and hit sub-rules 322H corresponding to sub-rules 322H having more than zero hits during the utilization period. The method 600 also includes, at operation 606, training a firewall utilization model 402 on the training data 432. At operation 608, the method 600 includes for each sub-rule 322 of the set of sub-rules 322 associated with the at least one firewall rule, determining, using the trained firewall utilization model 402, a corresponding sub-rule utilization probability 452 indicating a likelihood the sub-rule 322 will be used for a future connection request 28.

Figure 7:
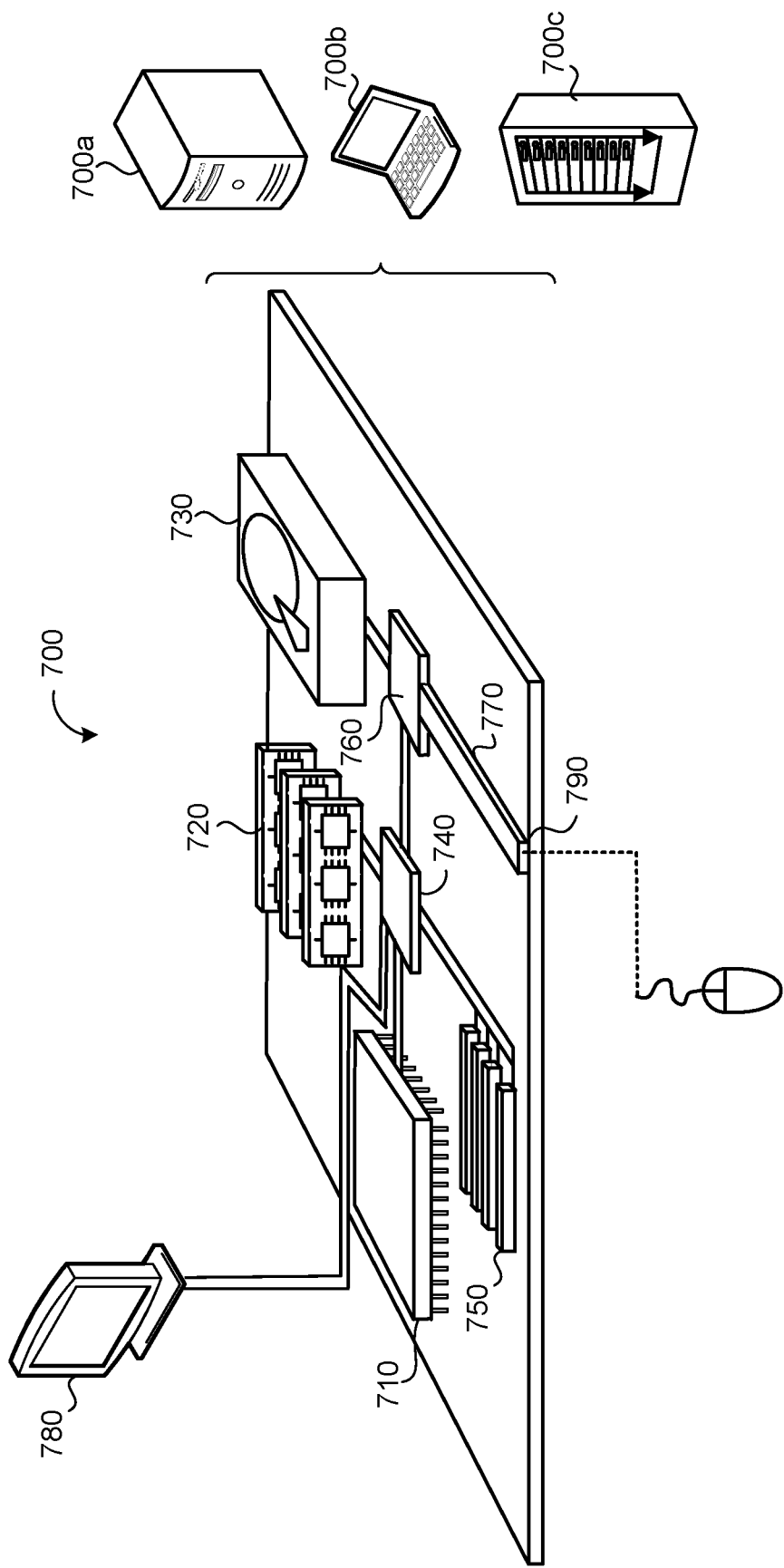
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    obtaining firewall utilization data for connection requests received by a firewall during a utilization period, the firewall utilization data including hit counts during the utilization period for each sub-rule of a set of sub-rules associated with at least one firewall rule;
    for each sub-rule of the set of sub-rules associated with the at least one firewall rule, determining, using a trained firewall utilization model, a corresponding sub-rule utilization probability indicating a likelihood the sub-rule will be used for a future connection request;
    generating firewall utilization insights based on the corresponding sub-rule utilization probability determined for each sub-rule;
    generating one or more firewall configuration recommendations based on the firewall utilization insights, each firewall configuration recommendation of the one or more firewall configuration recommendations recommending modification to one or more sub-rules of the set of sub-rules; and
    providing the one or more firewall configuration recommendations to a user.

2. The method of claim 1, wherein the operations further comprise generating training data based on the firewall utilization data, the training data including unused sub-rules corresponding to sub-rules having no hits during the utilization period and hit sub-rules corresponding to sub-rules having more than zero hits during the utilization period.

3. The method of claim 2, wherein the operations further comprise training the trained firewall utilization model on the training data.

4. The method of claim 1, wherein the operations further comprise:
    determining firewall attribute groupings for the at least one firewall rule, each firewall attribute grouping including at least one firewall attribute; and
    determining a first set of sub-rules associated with the at least one firewall rule based on the firewall attribute groupings.

5. The method of claim 4, wherein the operations further comprise:
    receiving a plurality of firewall logs associated with connection requests received by the firewall during the utilization period;
    filtering the plurality of the firewall logs based on a filter criteria;
    determining a second set of sub-rules associated with the plurality of firewall logs; and generating the firewall utilization data based on the first set of sub-rules and the second set of sub-rules.

6. The method of claim 4, wherein the firewall attribute groupings include at least three of:
   a source attribute grouping,
   a target attribute grouping,
   a port range, or
   an internet protocol (IP).

7. The method of claim 6, wherein:
   the firewall attribute groupings comprise the source attribute grouping; and
   the source attribute grouping comprises:
      source IP ranges;
      source tags; and
      source service accounts.

8. The method of claim 6, wherein:
   the firewall attribute groupings comprise the target attribute grouping; and
   the target attribute grouping comprises:
      target tags; and
      target service accounts.

9. The method of claim 1, wherein the operations further comprise receiving firewall reachability insights from a reachability module.

10. The method of claim 9, wherein generating the firewall configuration recommendations is based on aggregating the firewall reachability insights and the firewall utilization insights.

11. A system comprising:
   data processing hardware; and
   memory hardware in communication with the data processing hardware, the memory hardware storing instructions that when executed on the data processing hardware cause the data processing hardware to perform operations comprising:
      obtaining firewall utilization data for connection requests received by a firewall during a utilization period, the firewall utilization data including hit counts during the utilization period for each sub-rule of a set of sub-rules associated with at least one firewall rule;
      for each sub-rule of the set of sub-rules associated with the at least one firewall rule, determining, using a trained firewall utilization model, a corresponding sub-rule utilization probability indicating a likelihood the sub-rule will be used for a future connection request;
      generating firewall utilization insights based on the corresponding sub-rule utilization probability determined for each sub-rule;
      generating one or more firewall configuration recommendations based on the firewall utilization insights, each firewall configuration recommendation of the one or more firewall configuration recommendations recommending modification to one or more sub-rules of the set of sub-rules; and
      providing the one or more firewall configuration recommendations to a user.

12. The system of claim 11, wherein the operations further comprise generating training data based on the firewall utilization data, the training data including unused sub-rules corresponding to sub-rules having no hits during the utilization period and hit sub-rules corresponding to sub-rules having more than zero hits during the utilization period.

13. The system of claim 12, wherein the operations further comprise training the trained firewall utilization model on the training data.

14. The system of claim 11, wherein the operations further comprise:
   determining firewall attribute groupings for the at least one firewall rule, each firewall attribute grouping including at least one firewall attribute; and
   determining a first set of sub-rules associated with the at least one firewall rule based on the firewall attribute groupings.

15. The system of claim 14, wherein the operations further comprise:
   receiving a plurality of firewall logs associated with connection requests received by the firewall during the utilization period;
   filtering the plurality of the firewall logs based on a filter criteria;
   determining a second set of sub-rules associated with the plurality of firewall logs; and
   generating the firewall utilization data based on the first set of sub-rules and the second set of sub-rules.

16. The system of claim 14, wherein the firewall attribute groupings include at least three of:
   a source attribute grouping,
   a target attribute grouping,
   a port range, or
   an internet protocol (IP).

17. The system of claim 16, wherein:
   the firewall attribute groupings comprise the source attribute grouping; and
   the source attribute grouping comprises:
      source IP ranges;
      source tags; and
      source service accounts.

18. The system of claim 16, wherein:
   the firewall attribute groupings comprise the target attribute grouping; and
   the target attribute grouping comprises:
      target tags; and
      target service accounts.

19. The system of claim 11, wherein the operations further comprise receiving firewall reachability insights from a reachability module.

20. The system of claim 19, wherein generating the firewall configuration recommendations is based on aggregating the firewall reachability insights and the firewall utilization insights.

* * * * *